(12) United States Patent
Sulzbach et al.

(10) Patent No.: US 6,602,971 B2
(45) Date of Patent: Aug. 5, 2003

(54) PROCESS AND DEVICE FOR PRESSURIZING FLOWABLE REACTION COMPONENTS

(75) Inventors: Hans-Michael Sulzbach, Königswinter; Reiner Raffel, Siegburg, both of (DE)

(73) Assignee: Hennecke GmbH, Leverkusen (DE)

( * ) Notice: Subject to any disclaimer, the term of this patent is extended or adjusted under 35 U.S.C. 154(b) by 0 days.

(21) Appl. No.: 09/838,978

(22) Filed: Apr. 20, 2001

(65) Prior Publication Data

US 2001/0045233 A1 Nov. 29, 2001

(30) Foreign Application Priority Data

Apr. 25, 2000 (DE) .......................... 100 20 162

(51) Int. Cl.$^7$ ................................. C08G 9/00

(52) U.S. Cl. ........................ 528/44; 521/131

(58) Field of Search ............... 528/44; 521/131

(56) References Cited

U.S. PATENT DOCUMENTS

| | | | | |
|---|---|---|---|---|
| 4,658,583 A | | 4/1987 | Shropshire | 60/428 |
| 4,728,271 A | | 3/1988 | Harwath | 418/9 |
| 5,294,647 A | * | 3/1994 | Blampied et al. | 521/131 |
| 6,005,013 A | * | 12/1999 | Suh et al. | 521/131 |
| 6,258,863 B1 | * | 7/2001 | Harfmann et al. | 521/131 |
| 6,284,810 B1 | * | 9/2001 | Burnham et al. | 521/131 |
| 6,290,884 B1 | * | 9/2001 | Sakamoto et al. | 521/131 |
| 6,294,115 B1 | * | 9/2001 | Blizzard et al. | 521/131 |

FOREIGN PATENT DOCUMENTS

DE  34 45 454  6/1986

* cited by examiner

*Primary Examiner*—Morton Foelak
(74) *Attorney, Agent, or Firm*—Joseph C. Gil; Lyndanne M. Whalen

(57) ABSTRACT

Flowable reaction components of a reaction mixture which form solid or foamed material comprising filling material are transported from a storage container to a high-pressure mixing head in pressure stages by the use of gear pumps connected in series without major wear of the gear pumps.

16 Claims, 2 Drawing Sheets

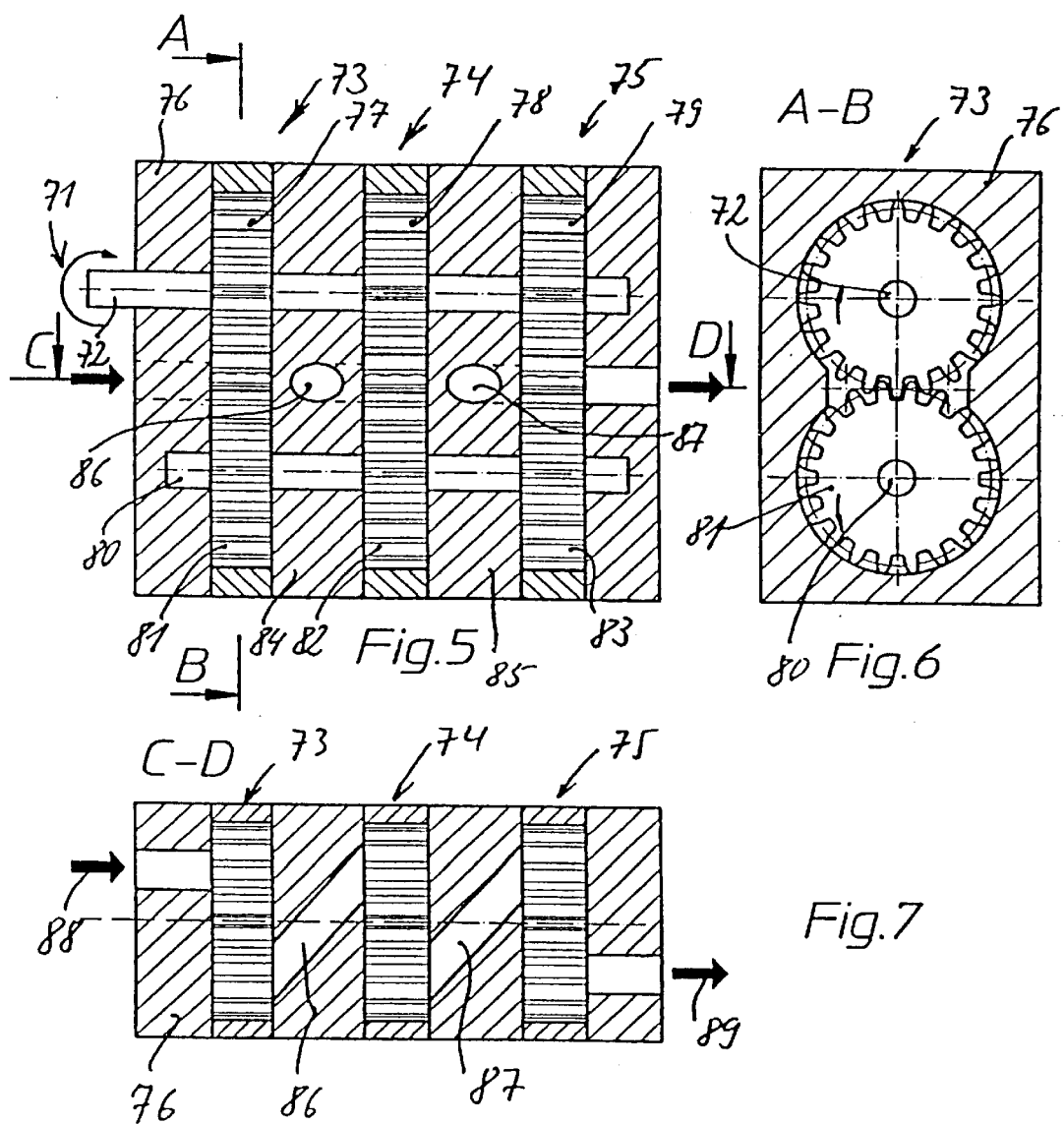

PROCESS AND DEVICE FOR PRESSURIZING FLOWABLE REACTION COMPONENTS

TECHNICAL FIELD OF THE INVENTION

The present invention is directed to a process and device for producing a reaction mixture forming solid material or foamed material from liquid flowable reaction components, wherein at least one of the flowable reaction components comprises filling material. According to the invention, the reaction components are transported from at least one storage container by pumps and metered under high pressure into a mixing head.

BACKGROUND OF THE INVENTION

Reaction components charged with filling material, such as those used in the manufacture of polyurethane articles, are known to possess high abrasive properties. As a result (and for economic reasons), the processing of such filled reaction components are prohibited in conjunction with particular devices, e.g. high pressure injection mixheads, requiring injection of the components (polyol and isocyanate) into the mixing chamber of the mixhead at pressure of above 100 bar and up to 300 bar.

Reaction components without filling material can be delivered using conventional high-speed, high-pressure piston pumps, subjected to high pressure such as 120 to 250 bar, metered, and then injected into the mixing chamber of a high-pressure mixing head. However, delivery of reaction components with filling material through such piston pumps is not possible. Normally, gear pumps may be used up to a pressure of about 100 bar at 1.500 to 3.000 rpm.

In producing certain articles, the high-pressure intermixing of reaction components charged with filling materials is indispensable. Even though wear by virtue of the abrasive filling materials can never be entirely eliminated, slow-running piston-type metering instruments or plunger pumps have been employed with success. However, such instruments have the disadvantage of a large overall height, with all the related disadvantages of maintenance. Additionally, the structure of such instruments is very elaborate and, therefore, expensive.

For the foregoing reasons, it would be desirable to develop a process and device for pressurizing to high pressure, reaction components charged with filling material by using instruments which are simply constructed and moderately priced and which operate reliably and with less wear. This is achieved by the present invention in that the flowable reaction components charged with filling material are brought to the desired high pressure in several pressure stages with gear pumps having the same rotary speed which are connected in series and via pipelines.

SUMMARY OF THE INVENTION

It is an object of the present invention to provide a process for transporting flowable reaction components of a reaction mixture, at least one of the flowable reaction components comprising filling material, by bringing the flowable reaction components to a predetermined pressure in several pressure stages through the use of gear pumps operated at low rotational speed.

It is another object of the present invention to provide a device for transporting flowable reaction components of a reaction mixture, at least one of the flowable reaction components comprising filling material, the device comprising gear pumps connected in series via pipelines, wherein pressure is provided in stages to the flowable reaction.

DESCRIPTION OF THE DRAWINGS

FIG. 5 illustrates a sectional view of a gear pump taken along line 5 of FIG. 1 comprising gear pumps arranged in series in a common housing.

FIG. 6 illustrates a cross sectional view of a gear pump taken along line A–B of FIG. 5.

FIG. 7 illustrates a cross sectional view of a gear pump taken along line C–D of FIG. 5.

DETAILED DESCRIPTION OF THE INVENTION

The invention is directed to a process for transporting and pressurizing flowable reaction components of a reaction mixture from at least one storage container to at least one mixing head, comprising the steps of:

(a) providing at least a first gear pump, a second gear pump, and a third gear pump, the first, second and third gear pumps having the same rotary speed of up to about 800 rpm;

(b) connecting the first gear pump to the second gear pump by a first pipeline, then connecting the second gear pump to the third gear pump by a second pipeline;

(c) transporting the flowable reaction components, at least one of the flowable reaction components comprising filling material, to the first gear pump, then through the first pipeline to the second gear pump, then through the second pipeline to the third gear pump; and (d) providing pressure on the flowable reaction components in stages.

Preferably the gear pumps are operated at up to 600 rpm, particularly preferred is a maximum of 400 rpm.

The pressure provided in each stage is preferably between about 30 to 70 bar.

The invention is also directed to a device for transporting flowable reaction components of a reaction mixture, at least one of the flowable reaction components comprising filling material, from at least one storage container to at least one mixing head, comprising: at least a first gear pump, a second gear pump, and a third gear pump, all having the same rotary speed, the first gear pump being connected to the second gear pump by a first pipeline, the second gear pump being connected to the third gear pump by a second pipeline, and providing pressure on the flowable reaction components in stages.

A key feature of the present invention is that several consecutive pressure stages comprising gear pumps are operated at the same rotary speed, connected via pipelines and arranged in series. Another key feature of the present invention is that the pressure level is increased by each gear pump until the desired high pressure is attained. The present invention is illustrated generally in FIG. 1.

Figure 1:
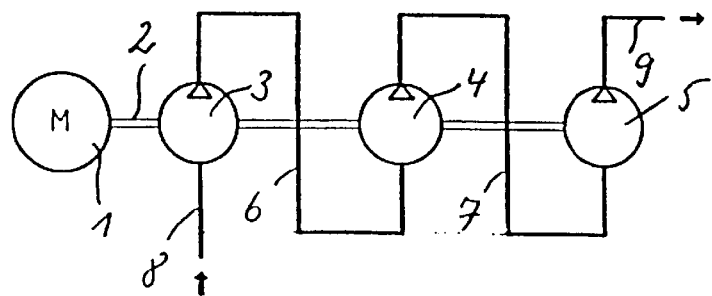
FIG. 1 illustrates the apparatus of the present invention comprising three gear pumps arranged on a common drive shaft and connected to one another via pipeline.

Referring now to FIG. 1, gear pumps 3, 4, and 5 are the so-called low-speed engines which are used in polyurethane application technology but which operate under low pressure, i.e. approximately up to about 60 bar. Gear pump 3 is preferably connected to gear pump 4 via pipeline 6. Gear pump 4 is preferably connected to gear pump 5 via pipeline 7. Line 8 emanating from a storage container (not represented) leads to gear pump 3. Line 9 leads from gear pump 5 to a high-pressure mixing head (not represented).

In a preferred embodiment of the present invention, gear pumps 3, 4, and 5 have a drive 1 with a common drive shaft 2. As a result, only a single drive motor is required, thus the rotary speeds of all the gear pumps are the same.

Gear pumps 3, 4 and 5, operating under low pressure, are subject to less wear in the delivery and metering of filled reaction components. Surprisingly, it has been discovered that the wear arising in the individual gear pumps remains within justifiable limits. Additionally, the wear arising in the series connection of gear pumps 3, 4 and 5 for the purpose of achieving high pressure, i.e., from 120 to 250 bar, remains within justifiable limits. Additionally, with such series connection, internal leakage of reaction components is kept within justifiable limits. "Internal leakage" is defined as that leakage which occurs internally between the suction side and the pressure side of a pump, which, as a result, generates loss in delivery and therefore affects the efficiency of the gear pump. This can, in principle, be calculated or preferably ascertained empirically by experiments and compensated in the stated manner.

Less wear of gear pumps 3, 4, and 5 is achieved due to a smaller pressure gradient per pressure stage. Thus, only a normal overall height of the device is necessary, and as such makes the system cost effective and manageable. Additionally, since gear pumps 3, 4 and 5 are of a simple construction, they can be exchanged more easily in the event of wear, which also makes the system cost effective and manageable.

An almost equally large increase in pressure is generated in each pressure stage. The term "pressure stage" refers to the pressure present between the entrance (suction side) of one gear pump and the entrance of the subsequent gear pump, such as that pressure present between gear pumps 3 and 4 and/or that pressure present between gear pumps 4 and 5. Since the increase in pressure generated in each pressure stage is roughly equal, the sequence of operations of the process becomes easily grasped. Additionally, the equality between pressure stages makes for a more reliable process.

The reaction components used in the present invention are those reaction components which have a compressibility of about 3% at 100 bar. This can, in principle, be calculated or preferably ascertained empirically by experiments and compensated in the stated manner. The gases (e.g. up to about volume percent (at normal pressure) of nitrogen or air as seed gases for subsequent foaming of the reaction mixture) that frequently have to be introduced into the reaction components during processing amplify this effect, according to their proportion.

This compressibility therefore becomes noticeable in a disadvantageous manner in the course of the new type of delivery using gear pumps in several pressure stages. Thus, preferably, at least as much delivery-volume surplus is offered from the pressure stage arranged upstream to the following pressure stage as is lost in the pressure stage arranged upstream as a result of internal leakage and compressibility of the reaction components.

The delivery-volume surplus may be provided by adjusting the supply capacity of the upstream pump to a respective higher capacity as compared to the subsequent pump. In a preferred embodiment of the present invention, the supply capacity of the upstream pump is adjusted with the gear wheels having about 3 to 10% larger extension in axial dimension as compared to those of the subsequent pump.

One advantage of the present invention is that the quantity of reaction components delivered in excess from the pressure stage upstream is drained off downstream of the pressure stage and is either recycled back into the system or is recycled back into the storage container. As a result, the subsequent pressure stage always receives more flowable reaction components than it requires for the further pressure increase of the pressurized reaction components. As a result, an undesirable suction effect of the subsequent pressure stage is avoided.

However, in order to keep the amount of pressurized reaction components conveyed back as small as possible, after each pressure stage the pressure of the reaction components that is generated therein is preferably measured and the increase in pressure of the pressure stage is adjusted accordingly. For the same reason, after at least one pressure stage the pressure of the reaction components that is generated therein is preferably measured and the increase in pressure of the pressure stage is regulated as a function of the measured value. This regulation is particularly appropriate when the compressibility of the reaction components is dependent on temperature. These measures are particularly advantageous when the charged reaction components, viewed over time, exhibit fluctuating gas content and/or fluctuating processing temperatures.

It is preferred that filling material be already fed into the reaction components prior to the processing thereof. However, filling material can also be fed into the line system upstream of the gear pumps.

Figure 2:
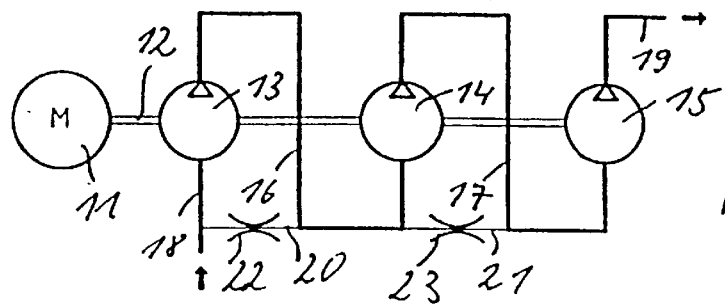
FIG. 2 illustrates a preferred embodiment of the apparatus of the present invention comprising throttling elements arranged in pipeline between adjacent gear pumps.

Referring now to FIG. 2, gear pump 13 is connected to gear pump 14 via outgoing line 16. Gear pump 14 is connected to gear pump 15 via outgoing line 17. Line 18 emanating from a storage container (not represented) leads to gear pump 13. Line 19 leads from gear pump 15 to a high-pressure mixing head (not represented). Return line 20, bypassing gear pump 13, connects outgoing line 16 to line 18. Return line 21, bypassing gear pump 14, connects outgoing line 17 to outgoing line 16. A first throttling element 22 is arranged in return line 20. A second throttling element 23 is arranged in return line 21.

Outgoing line 16 of gear pump 13 is preferably connected via return line 20 to either line 18 or to a storage container (not represented). Outgoing line 17 of gear pump 14 is preferably connected via return line 21 to either outgoing line 16 or to a storage container (not represented). Return lines 20 and 21 allow for excess reaction components to be recycled back into the system, preferably to the suction side of the gear pump generating the excess reaction components or to the storage container.

In a preferred embodiment of the present invention, gear pumps 13, 14, and 15 have a drive 11 with a common drive shaft 12. As a result, only a single drive motor is required, thus the rotary speeds of all the gear pumps are the same.

Figure 3:
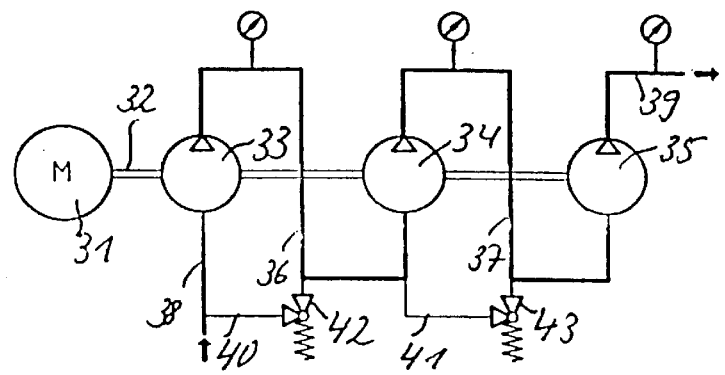
FIG. 3 illustrates another preferred embodiment of the apparatus of the present invention comprising pressure-limiting valves arranged in pipeline between adjacent gear pumps.

Referring now to FIG. 3, gear pump 33 is connected to gear pump 34 via outgoing line 36. Gear pump 34 is connected to gear pump 35 via outgoing line 37. Line 38 emanating from a storage container (not represented) leads to gear pump 33. Line 39 leads from gear pump 35 to a high-pressure mixing head (not represented). Return line 40, bypassing gear pump 33, connects outgoing line 36 to line 38. Return line 41, bypassing gear pump 34, connects outgoing line 37 to outgoing line 36. A first pressure-limiting valve 42 is arranged in return line 40. A second pressure-limiting valve 43 is arranged in return line 41.

Pressure-limiting valve 42 opens automatically into return line 40, at a set pressure, thereby protecting gear pump 34 against any excessively high pressure that is generated in gear pump 33. Pressure-limiting valve 43 opens automatically into return line 41, at a set pressure, thereby protecting gear pump 35 against any excessively high pressure that is generated in gear pump 34.

In a preferred embodiment of the present invention, gear pumps 33, 34, and 35 have a drive 31 with a common drive shaft 32. As a result, only a single drive motor is required, thus the rotary speeds of all the gear pumps are the same.

Figure 4:
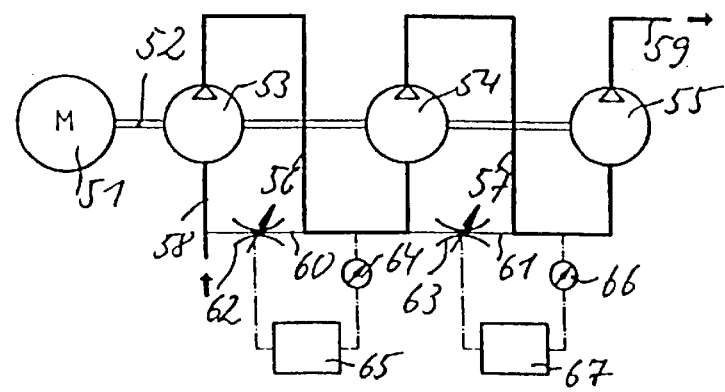
FIG. 4 illustrates yet another preferred embodiment of the apparatus of the present invention comprising a pressure regulator.

Referring now to FIG. 4, gear pump 53 is connected to gear pump 54 via outgoing line 56. Gear pump 54 is connected to gear pump 55 via outgoing line 57. Line 58 emanating from a storage container (not represented) leads to gear pump 53. Line 59 leads from gear pump 55 to a high-pressure mixing head (not represented). Return line 60, bypassing gear pump 53, connects outgoing line 56 to line 58. Return line 61, bypassing gear pump 54, connects outgoing line 57 to outgoing line 56. A first throttling element 62 is arranged in return line 60. A second throttling element 63 is arranged in return line 61. In a preferred embodiment of the present invention, throttling element 62 can exert an influence on the return quantity in return line 60. In another preferred embodiment of the present invention, throttling element 63 can exert an influence on the return quantity in return line 61.

Preferred throttling elements are orifice plates. Most preferred throttling elements are adjustable orifice plates. In a preferred embodiment of the present invention, the throttling elements set the pressure for the respective return quantity in the return line and hence the increase in pressure, or, to be more exact, the pressure upstream of the subsequent pressure stage.

The throttling element exerts an influence on the quantity of recycled reaction components. It is preferred that throttling element 62 have control instrument 65 connected thereto. It is also preferred that throttling element 63 have control instrument 67 connected thereto. Pressure gauge 64 is connected to both outgoing line 56 and to control instrument 65. Pressure gauge 66 is connected to both outgoing line 57 and to control instrument 67. The control instrument is assigned to the throttling element to which it is attached.

In a preferred embodiment of the present invention, gear pumps 53, 54, and 55 comprise drive 51 with a common drive shaft 52. As a result, only a single drive motor is required, thus the rotary speeds of all the gear pumps are the same.

In a preferred embodiment of the present invention, the throttling element can be ventilated, thereby allowing agglomerates of filling material, which are possibly dammed up in front of the throttling element, to pass through the throttling element.

Referring now to FIGS. 5, 6 and 7, drive 71 drives common drive shaft 72. On drive shaft 72, three gear pumps 73, 74 and 75, are arranged in common housing 76. Gear pump 73 comprises toothed gear 77. Gear pump 74 comprises toothed gear 78. Gear pump 75 comprises toothed gear 79. Toothed gears 77, 78 and 79 are arranged around drive shaft 72. The toothed gears are preferably arranged in a stepped manner. Shaft 80 comprises mating toothed gears 81, 82, and 83. In a preferred embodiment of the present invention, toothed gear 77 mates with mating toothed gear 81, thereby forming a first pressure stage, while toothed gear 78 mates with mating toothed gear 82, thereby forming a second pressure stage, and toothed gear 79 mates with mating toothed gear 83 thereby forming a third pressure stage. Mating toothed gear 81 is separated from mating toothed gear 82 by partition 84. Mating toothed gear 82 is separated from mating toothed gear 83 by partition 85. Mating toothed gear 81 has a width B1, while mating toothed gear 82 has a width B2, and mating toothed gear 83 has a width B3. In a preferred embodiment of the present invention, B1>B2>B3.

Gear pump 73 is connected to gear pump 74 via pipeline 86. Gear pump 74 is connected to gear pump 75 via pipeline 87. Line 88 emanating from a storage container (not represented) leads to pump 73. Line 89 leads from pump 75 to a high-pressure mixing head (not represented). In order to avoid internal leakage, toothed gears 77, 78 and 79 closely fit with mating toothed gears 81, 82 and 83. Additionally, in order to avoid internal leakage, partitions 84 and 85 closely fit with housing 76.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for transporting and pressurizing flowable reaction components of a reaction mixture from at least one storage container to at least one mixing head, comprising the steps of:
   (a) providing at least a first gear pump, a second gear pump, and a third gear pump, the first, second and third gear pumps having the same rotary speed of up to about 800 rpm.
   (b) connecting the first gear pump to the second gear pump by a first pipeline then connecting the second gear pump to the third gear pump by a second pipeline;
   (c) transporting the flowable reaction components, at least one of the flowable reaction components comprising filling material, to the first gear pump, then through the first pipeline to the second gear pump, then through the second pipeline to the third gear pump; and
   (d) providing pressure on the flowable reaction components in stages.

2. The process according to claim 1, wherein a first pressure stage begins at the first gear pump, a second pressure stage begins at the second gear pump, and a third pressure stage begins at the third gear pump.

3. The process according to claim 2, wherein the volume surplus of flowable reaction components at the second pressure stage is about equal the volume of flowable reaction components lost at the first pressure stage.

4. The process according to claim 2, wherein the volume surplus of flowable reaction components at the third pressure stage is about equal the volume of flowable reaction components lost at the second pressure stage.

5. The process according to claim 2, wherein the pressure level is increased at each pressure stage.

6. The process according to claim 5, wherein about an equally large increase in pressure is provided to the first pressure stage, the second pressure stage and the third pressure stage.

7. The process according to claim 2, wherein excess flowable reaction components transported in the first pressure stage channel downstream from the first pressure stage and are recycled back into the process upstream from the first pressure stage.

8. The process according to claim 2, wherein excess flowable reaction components transported in the second pressure stage channel downstream from the second pressure stage and are recycled back into the process upstream from the second pressure stage.

9. The process according to claim 2, wherein excess flowable reaction components transported in the first pressure stage channel downstream from the first pressure stage and are recycled back into a storage container.

10. The process according to claim 2, wherein excess flowable reaction components transported in the second pressure stage channel downstream from the second pressure stage and are recycled back into a storage container.

11. A process according to claim 2, wherein the pressure of the first pressure stage is measured.

12. A process according to claim 2, wherein the pressure of the second pressure stage is measured.

13. A process according to claim 2, wherein the pressure of the first pressure stage is adjusted.

14. A process according to claim 2, wherein the pressure of the second pressure stage is adjusted.

15. A process according to claim 13, wherein the pressure is adjusted as a function of the measured value of the pressure generated from the first pressure stage.

16. A process according to claim 14, wherein the pressure is adjusted as a function of the measured value of the pressure generated from the second pressure stage.

* * * * *